(12) United States Patent
Moon

(10) Patent No.: US 9,063,602 B2
(45) Date of Patent: Jun. 23, 2015

(54) DISPLAY DEVICE AND CONTROL METHOD OF THE SAME

(75) Inventor: Seung-hwan Moon, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1804 days.

(21) Appl. No.: 11/929,034

(22) Filed: Oct. 30, 2007

(65) Prior Publication Data

US 2008/0231606 A1    Sep. 25, 2008

(30) Foreign Application Priority Data

Mar. 23, 2007    (KR) .................. 10-2007-0028822

(51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01); *G06F 3/0414* (2013.01)

(58) Field of Classification Search
USPC ............. 345/156, 174–178; 178/18.01–20.04
See application file for complete search history.

(56) References Cited

U.S. PATENT DOCUMENTS

| | | | | |
|---|---|---|---|---|
| 4,598,305 A | * | 7/1986 | Chiang et al. .................. 257/66 |
| 4,786,896 A | * | 11/1988 | Harte ............................ 345/173 |
| 5,414,413 A | * | 5/1995 | Tamaru et al. ................ 345/175 |
| 5,923,320 A | * | 7/1999 | Murakami et al. ............ 345/179 |
| 6,137,427 A | * | 10/2000 | Binstead ........................ 341/33 |
| 6,239,788 B1 | * | 5/2001 | Nohno et al. ................. 345/173 |
| 2004/0227743 A1 | | 11/2004 | Brown |
| 2005/0212916 A1 | | 9/2005 | Nakamura et al. |
| 2006/0097991 A1 | * | 5/2006 | Hotelling et al. ............. 345/173 |
| 2006/0146035 A1 | * | 7/2006 | Cha et al. ...................... 345/173 |
| 2008/0062148 A1 | * | 3/2008 | Hotelling et al. ............. 345/174 |

FOREIGN PATENT DOCUMENTS

| | | |
|---|---|---|
| CN | 1722215 A | 1/2006 |
| JP | 2005174361 | 6/2005 |
| JP | 2006079589 | 3/2006 |
| KR | 1020010061329 | 7/2001 |

* cited by examiner

*Primary Examiner* — Kathy Wang-Hurst
*Assistant Examiner* — Jose Soto Lopez
(74) *Attorney, Agent, or Firm* — Cantor Colburn LLP

(57) ABSTRACT

A display device includes a display panel including a plurality of pixels, a sensing electrode generating a sensing signal in response to an external stimulus, a sensing line connected to the sensing electrode, a sensing driver connected to the sensing line, receiving the sensing signal from the sensing line and storing the sensing signal as a specific register value, and outputting a position pulse according to the specific register value, and a signal controller determining a position of the external stimulus based on the position pulse and a predetermined clock signal.

17 Claims, 9 Drawing Sheets

DISPLAY DEVICE AND CONTROL METHOD OF THE SAME

This application claims priority to Korean Patent Application No. 10-2007-0028822, filed on Mar.23, 2007, and all the benefits accruing therefrom under 35 U.S.C. §119, the contents of which are incorporated herein by reference in their entirety.

BACKGROUND OF INVENTION

1. Field of Invention

Apparatuses and methods consistent with the present invention relates to a display device and a control method of the same, more particularly, to a display device which has an inner type touch panel.

2. Description of the Related Art

A touch panel accepts user input by means of a touch of a finger or an object to select contents displayed on a screen of a display panel, such as a liquid crystal display panel. The touch panel may be provided at the uppermost side of a display device. A display device with a touch panel does not need input components such as a keyboard, a mouse, etc., and thus it is becoming popular.

An inner type touch panel has been developed, where a pressure sensing sensor to sense an external contact is not separately provided as a panel but mounted in a display panel. In the inner type touch panel, an electrode and a spacer for sensing are formed where a pixel is formed. If a predetermined stimulus is applied or given from the outside, a sensing electrode transmits an electric signal to a sensing driver through a plurality of sensing lines, such as may extend parallel with a gate line and a data line.

If the touch panel is given a stimulus by a touch of a finger or a pointer, a plurality of sensing electrodes may respond to the stimulus because of their distribution of high density. Also, as the sensing electrodes are disposed close to the panel, sensing electrodes disposed in a region where a stimulus is not given may respond to the stimulus due to neighboring sensing electrodes which is given the stimulus. Thus, it is not easy to sense a right position where a stimulus is generated.

BRIEF SUMMARY OF THE INVENTION

An exemplary embodiment provides a display device which efficiently responds to an external stimulus and is improved in its sensitivity and a control method of the same.

An exemplary embodiment of a display device includes a display panel which includes a plurality of pixels, a sensing electrode which generates a sensing signal in response to an external stimulus, a sensing line connected to the sensing electrode, a sensing driver which is connected to the sensing line, receives the sensing signal from the sensing line and stores the sensing signal as a specific register value, and outputs a position pulse according to the specific register value, and a signal controller which determines a position where the stimulus based on the position pulse and a predetermined clock signal.

In an exemplary embodiment, the sensing signal includes a predetermined electric signal, and the sensing driver stores the predetermined electric signal as the specific register value if the predetermined electric signal is greater then a preset reference value.

In an exemplary embodiment, the signal controller outputs a sensing scan signal to the sensing driver, and the sensing driver scans the sensing line while being synchronized with the sensing scan signal and the predetermined clock signal.

In an exemplary embodiment, the position pulse includes a high range which corresponds to a part of the display panel where the external stimulus is applied to the display panel.

In an exemplary embodiment, the signal controller determines a position of the sensing line which is scanned by synchronizing with a third clock signal corresponding to a third count value calculated by the following Equation 1, if a first count value refers to a count value of a first clock signal defined by when the sensing scan signal is output to when the high range of the position pulse starts, and a second count value refers to a count value of a second clock signal during the high range. Equation 1 states that third count value=first count value+(second count value/2).

In an exemplary embodiment, the sensing driver includes a driving chip disposed along a side of the display panel.

In an exemplary embodiment, the driving chip includes a first driving chip and a second driving chip disposed adjacent to the first driving chip, and the first driving chip and the second driving chip are connected to a plurality of sensing lines, respectively. The signal controller determines that the external stimulus is applied in a position of a third sensing line disposed at a middle point of a position of a first sensing line included in a first high range, and a position of a second sensing line included out in a second high range if the first high range of a first position pulse output from the first driving chip and the second high range of a second position pulse output from the second driving chip are successive.

In an exemplary embodiment, the sensing line includes a Y sensing line which extends in a first direction and transmits a Y position information of a position where the external stimulus is applied on the display panel, and an X sensing line which extends in a second direction substantially perpendicular to the first direction and transmits an X position information of a position where the external stimulus is applied on the display panel. The sensing driver includes a Y sensing driving chip connected to the Y sensing line, and an X sensing driving chip connected to the X sensing line.

In an exemplary embodiment, the signal controller calculates a decimal count value of a binary code corresponding to a sum of a first code and a third code, and determines a position of the sensing line scanned by synchronizing with a clock signal of the decimal count value, if the first code refers to a binary code of a first count value of a clock signal from when the sensing scan signal is output to when the high range of the position pulse starts, a second code refers to a binary code of a second count value of the clock signal during the high range, and the third code refers to a binary code that one lowest code is deleted from the second code.

In an exemplary embodiment, the sensing driver includes a driving chip disposed along a side of the display panel.

In an exemplary embodiment, the driving chip includes a first driving chip and a second driving chip disposed adjacent to the first driving chip, the first driving chip and the second driving chip are connected to a plurality of sensing lines, respectively. The signal controller determines that the external stimulus is applied in a position of a third sensing line disposed at a middle point of a position of a first sensing line included in a first high range and a position of a second sensing line included out in a second high range, if the first high range of a first position pulse output from the first driving chip and the second high range of a second position pulse output from the second driving chip are successive.

In an exemplary embodiment, the sensing line includes a Y sensing line which extends in a first direction and transmits a Y position information of a position where the external stimulus is applied, and an X sensing line which extends in a second direction substantially perpendicular to the first direction and transmits an X position information of a position where the external stimulus is applied. The sensing driver includes a Y sensing driving chip connected to the Y sensing line, and an X sensing driving chip connected to the X sensing line.

In an exemplary embodiment, the display device further includes a gate line and a data line which crosses the gate line, the gate line and the data line being formed on the display panel, a gate driving chip which applies a gate signal to the gate line, and a data driving chip which applies a data signal to the data line, wherein the sensing driver is mounted in the gate driving chip or the data driving chip.

An exemplary embodiment of a control method of a display device which includes a plurality of pixels and a plurality of sensing lines includes receiving a sensing signal from the sensing lines, storing the sensing signal as a specific register value, outputting a position pulse which includes a high range corresponding to a part of the display device where a stimulus is applied according to the specific register value, and determining a position where the stimulus is applied on a basis of the position pulse and a predetermined clock signal.

In an exemplary embodiment, the control method further includes scanning the sensing lines synchronizing with a predetermined sensing scan signal and the predetermined clock signal before the storing the specific register value.

In an exemplary embodiment, the sensing signal includes a predetermined electric signal, and the storing the specific register value includes storing the predetermined electric signal as the specific register value if the predetermined electric signal is greater than a preset reference value.

In an exemplary embodiment, the determining a position includes defining a first count value where a clock signal is counted from when the predetermined sensing scan signal is output to when the high range of the position pulse starts, defining a second count value where a clock signal is counted during the high range, and calculating a third count value by the following Equation 1 and determining a position of the sensing lines scanned by synchronizing with a clock signal corresponding to the third count value. Equation 1 states that third count value=first count value+(second count value/2)

In an exemplary embodiment, the display device includes a first driving chip and a second driving chip disposed adjacent to the first driving chip, the first driving chip and the second driving chip being connected to the plurality of sensing lines, respectively. The determining a position determines that the stimulus is applied in a position of a third sensing line disposed at a middle point of a position of a first sensing line included in a first high range and a position of a second sensing line included in a second high range if the first high range of a first position pulse output from the first driving chip, and the second high range of a second position pulse output from the second driving chip are successive.

In an exemplary embodiment, the determining a position includes determining a first count value where a clock signal is counted from when the predetermined sensing scan signal is output to when the high range of the position pulse starts and the first count value is converted into a binary code, determining a second count value where a clock signal is counted during the high range and the second count value is converted into a binary code, and calculating a decimal value of a binary code corresponding to a sum of a first code and a third code and determining a position of the sensing lines scanned by synchronizing with a clock signal of the decimal count value if the first code refers to the binary code of the first count value, a second code refers to the binary code of the second count value, and the third code refers to a binary code that one lowest code is deleted from the second code.

In an exemplary embodiment, the display device includes a first driving chip and a second driving chip disposed adjacent to the first driving chip, the first driving chip and the second driving chip being connected to the plurality of sensing lines, respectively. The determining a position determines that the stimulus is applied in a position of a third sensing line disposed at a middle point of a position of a first sensing line included in a first high range and a position of a second sensing line included in a second high range if the first high range of a first position pulse output from the first driving chip and the second high range of a second position pulse output from the second driving chip are successive.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE INVENTION

Figure 1:
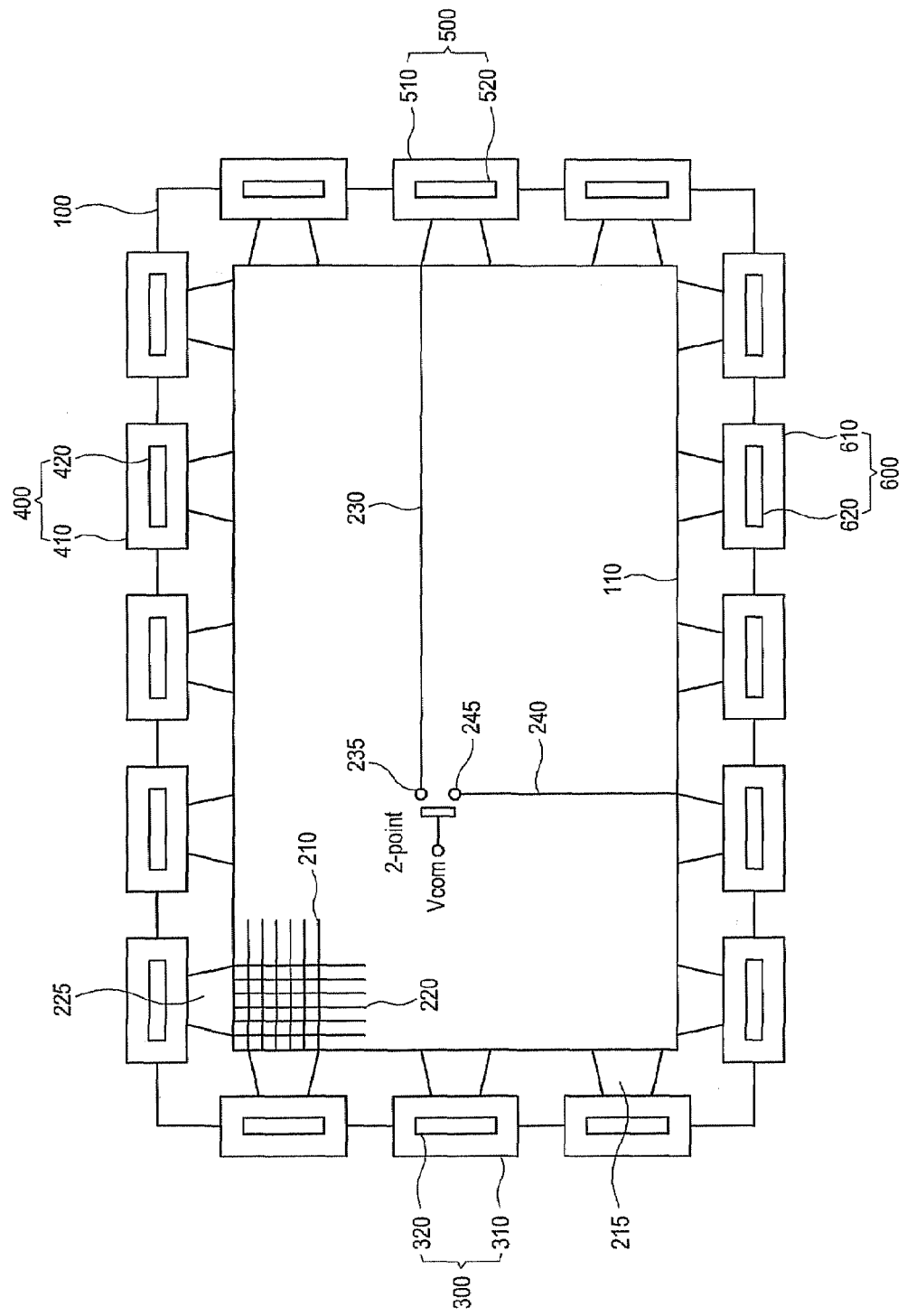
FIG. 1 is a schematic view of an exemplary embodiment of a display device according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Reference will now be made in detail to the embodiments of the present invention, examples of which are illustrated in the accompanying drawings, wherein like reference numerals refer to like elements throughout. The embodiments are described below so as to explain the present invention by referring to the figures.

Figure 2:
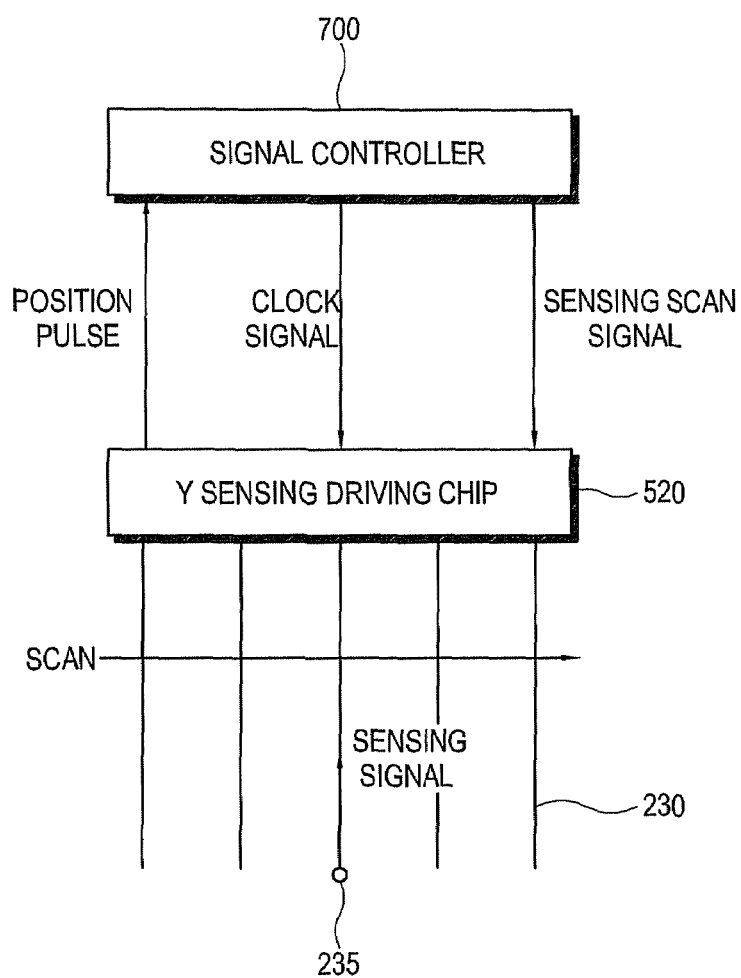
FIG. 2 is an exemplary embodiment of a control block diagram illustrate output relations of signals in the display device of FIG. 1 according to the present invention.

Referring to FIGS. 1 and 2, a display device includes a display panel 100 where a display region 110 is formed, a plurality of driving units 300, 400, 500 and 600 connected to the display panel 100, and a circuit board (not shown) which generates various kinds of signals to be applied to the driving units 300, 400, 500 and 600.

The driving units 300, 400, 500 and 600 includes a gate driving unit 300 connected to a gate line 210, a data driving unit 400 connected to a data line 220, a Y sensing driving unit 500 connected to a Y sensing line 230 and an X sensing driving unit 600 connected to an X sensing line 240. In an exemplary embodiment, the driving units 300, 400, 500 and 600 may include flexible films 310, 410, 510 and 610 and driving chips 320, 420, 520 and 620 mounted on the flexible films 310, 410, 510 and 610, respectively. Leads are formed on the flexible films 310, 410, 510 and 610 and connect the driving chips 320, 420 and 520 and 620 with the signal lines 210, 220, 230 and 240, respectively.

An exemplary embodiment of the display panel 100 may be provided as a liquid crystal display ("LCD") panel, which includes a liquid crystal layer, an organic light emitting diode which includes an organic light emitting layer, etc., and includes a plurality of pixels substantially in a matrix form. The gate line 210 which extends in a first direction (e.g., a longitudinal or horizontal direction in the plane view of FIG. 1), the data line 220 which insulatingly crosses the gate line 210 in a transverse or vertical direction in the plane view of FIG. 1, and a thin film transistor ("TFT") (not shown) formed at an intersection area of the gate line 210 and the data line 220 are formed on the display panel 100. In one exemplary embodiment, a pixel or pixel area may be defined by a gate line and a data line.

The gate line 210 is connected to the gate driving unit 300 in an area outside of the display region 110, and transmits a gate signal output from the gate driving unit 300 to the TFT. The data line 220 is connected to the data driving unit 400 in an area outside of the display region 110, and transmits a data signal corresponding to an image signal to the TFT.

As illustrated in FIG. 1, the gate line 210 and the data line 220 include fan-out portions 215 and 255. In the fan-out portions 215 and 225, an interval between the gate lines 210 and an interval between the data lines 220 becomes narrower as a distance from the outside the display region 110 increases, such as where the gate lines 210 and the data lines 220 are connected to the driving units 300 and 400, respectively.

The gate driving chip 320 corresponds to a gate driver which applies a gate signal including, but not limited to, a gate-on voltage and a gate-off voltage, to the gate line 210. The data driving chip 420 corresponds to a data driver which generates a data signal to be applied to the data line 220. In the illustrated exemplary embodiment, the gate driving chip 320 and the data driving chip 420 are mounted on the flexible films 310 and 410, such as in a chip on film ("COF") method, to be connected to the display panel 100. Alternatively, the driving chips 320 and 420 may be directly mounted on a non-display region of the display panel 100, such as including a chip on glass ("COG") method.

Referring again to FIG. 1, sensing electrodes 235 and 245 which generate a predetermined electric signal in response to an external stimulus, and a plurality of sensing lines 230 and 240 connected to the sensing electrodes 235 and 245 are formed on the display panel 100. If a stimulus is applied or given from the outside, a common voltage Vcom which is applied to the entire display panel 100 is transmitted to the sensing electrodes 235 and 245. The transmitted electric signal is output to the sensing driving units 500 and 600 through the sensing electrodes 235 and 245 and the sensing lines 230 and 240, respectively.

In an exemplary embodiment, the sensing electrodes 235 and 245 may be uniformly disposed throughout the display panel 100, and include a Y sensing electrode 235 to indicate a Y position information of a location where a stimulus is given, and an X sensing electrode 245 to indicate an X position information of a location where the stimulus is given. The Y sensing electrode 235 is connected to the Y sensing lines 230, and the X sensing electrode 245 is connected to the X sensing lines 240. The Y sensing lines 230 are arranged substantially parallel with the gate line 210, and each of the Y sensing lines 230 is formed between two gate lines 210. Likewise, the X sensing lines 240 extend substantially parallel to and are arranged in between the data lines 220.

The Y sensing driving chip 520 is connected to the Y sensing line 230, and the X sensing driving chip 620 is connected to the X sensing line 240. As in the illustrated embodiment, a plurality of Y sensing driving chips 520 and X sensing driving chips 620 are provided along a side (e.g., at an edge) of the display region 110. The Y sensing driving chips 520 and the X sensing driving chips 620 are provided as a sensing driver which outputs a position pulse according to a sensing signal transmitted from the sensing lines 230 and 240. In one exemplary embodiment, the Y sensing driving chips 520 and/or the X sensing driving chips 620 may be formed by a COG method as well as the gate driving chip 320 and/or the data driving chip 420.

FIG. 2 is an exemplary embodiment of a control block diagram including a signal controller 700 and the Y sensing driving chips 520 illustrating signals output/input between the signal controller 700 and the Y sensing driving chips 520. Control methods between the signal controller 700 and the Y driving chips 520 and between the signal controller 700 and the X driving chips 620 are similar, thus the control method between the signal controller 700 and the X driving chips 620 will not be repeated. A control method between the signal controller 700 and the Y sensing driving chips 520 will be described as an exemplary embodiment with reference to FIG. 2.

In an exemplary embodiment, the signal controller 700 is formed on an external circuit board and outputs image signals and overall control signals to the driving chips 320, 420, 520 and 620, respectively, to apply the signals to the display panel 100. As illustrated by the arrows in FIG. 2, the signal controller 700 outputs a clock signal and a sensing scan signal to the Y sensing driving chips 520 and determines a location where a stimulus is generated on the basis of a position pulse and a clock signal input to the signal controller 700 from the Y sensing driving chips 520.

As used herein, the sensing scan signal is a signal which sequentially scans the Y sensing lines 230 to inspect and sense whether a sensing signal is input. A plurality of sensing scan signals output from the signal controller 700 may be input to the Y sensing driving chips 520, respectively. Alternatively, one sensing scan signal may be transmitted in a specific direction or sequence to the Y sensing driving chips 520 disposed adjacent to each other.

The Y sensing driving chips 520 scan the Y sensing lines 230 (e.g., as shown by the SCAN arrow), while synchronizing with a sensing scan signal and a clock signal. If a switch 522 (FIG. 3) is turned on by the sensing scan signal, the Y sensing driving chips 520 are input with a sensing signal from the Y sensing lines 230 where a stimulus is generated. The Y sensing driving chips 520 store the received sensing signal as a specific register value and output a position pulse according to the stored register value.

Figure 3:
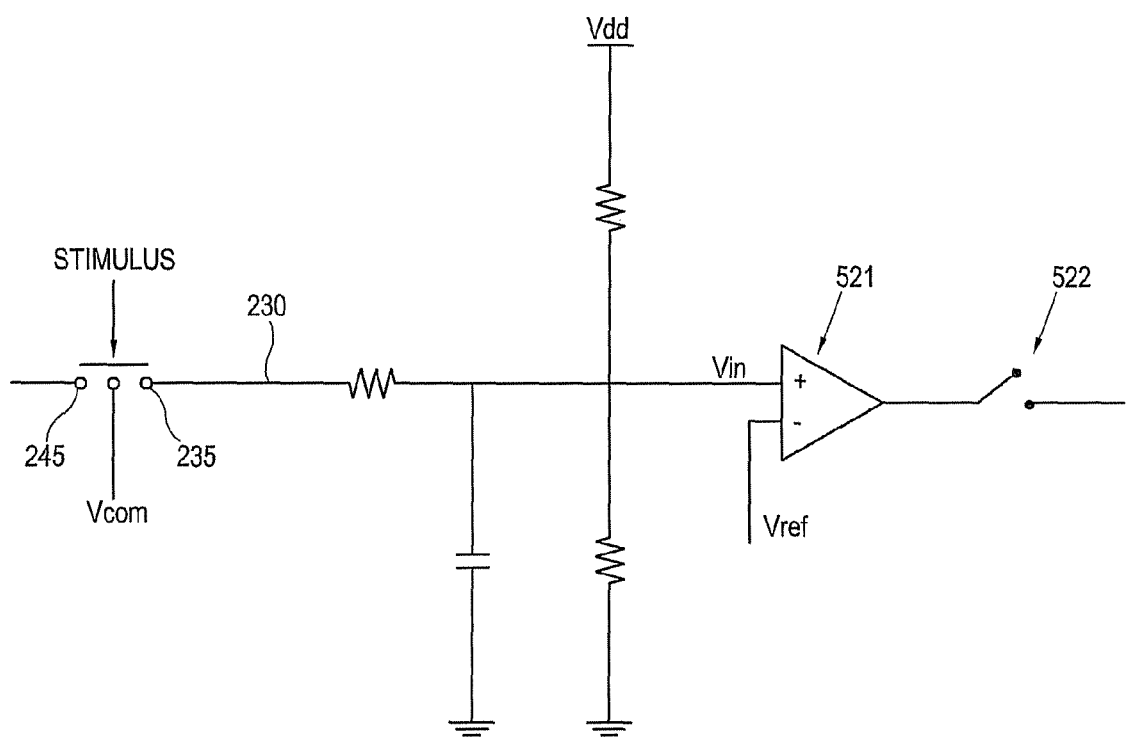
FIG. 3 is a schematic circuit diagram of an exemplary embodiment of a sensing driver according to the present invention.

Referring to FIGS. 2 and 3, the Y sensing driving chips 520 include a comparator 521 to compare a voltage Vin transmitted from the Y sensing electrodes 235 with a predetermined reference value Vref, and the switch 522 to transmit a sensing scan signal. If a stimulus is applied to a part of the display panel 100 (e.g., a location or area) corresponding to the Y sensing electrodes 235, a common voltage Vcom is input to the Y sensing driving chips 520 through the Y sensing electrodes 235 and the Y sensing lines 230.

A voltage Vin input to the Y sensing driving chips 520 is input to the comparator 521. The comparator 521 compares the input voltage Vin with a predetermined reference value Vref. The Y sensing driving chips 520 output a specific analog signal only if the input voltage Vin is over the reference value Vref. In other words, the Y sensing driving chips 520 store the voltage Vin as a register value only when the voltage Vin is considered to be generated by a stimulus.

Figure 4:
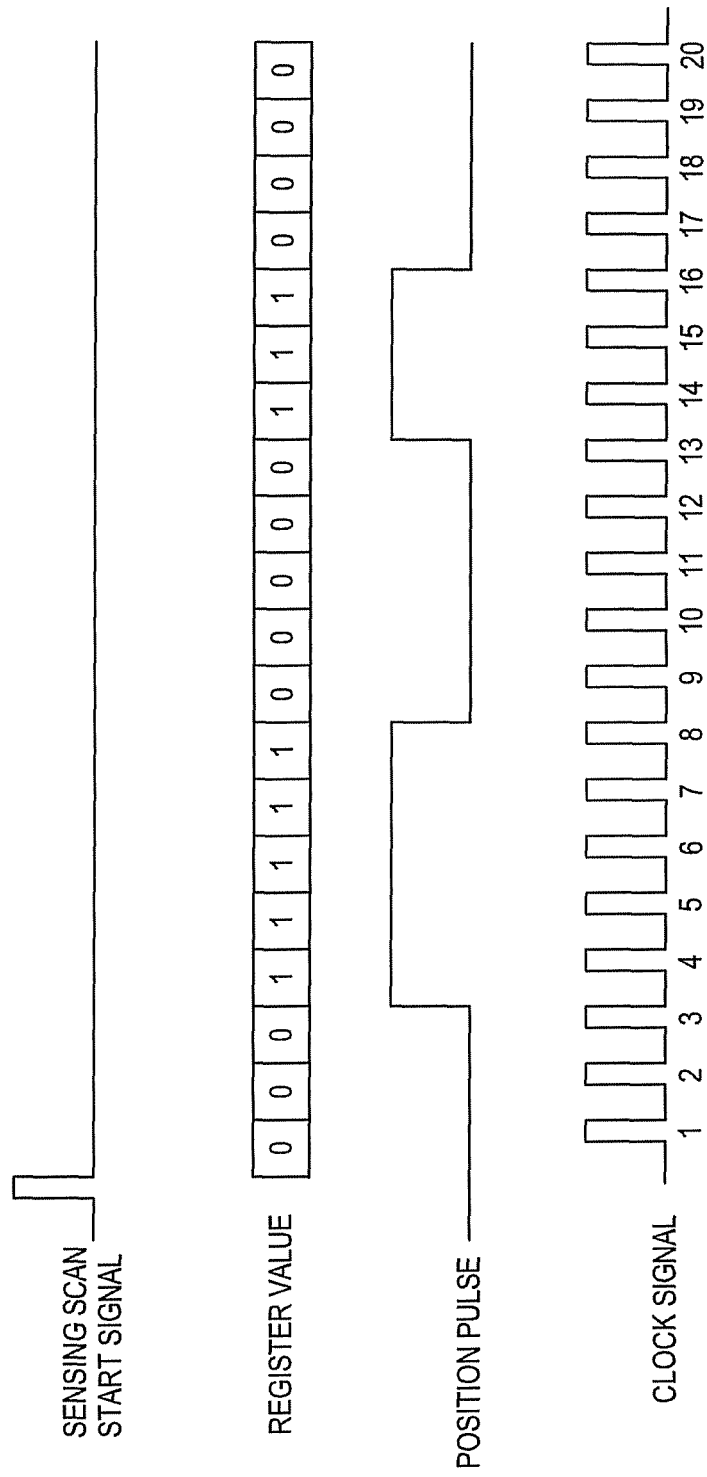
FIG. 4 is an exemplary embodiment of a waveform of a signal in the display device of FIG. 1 according to the present invention.

FIG. 4 is an exemplary embodiment of a waveform of a signal in the display device of FIG. 1 according to the present invention. Referring to FIG. 4, the Y sensing driving chips 520 include a predetermined memory therein to store zero (e.g., "0") if a sensing signal is not input, and to store one (e.g., "1") if a sensing signal is input. That is, a value of 1 corresponds to a register value (e.g., when the voltage Vin is considered to be generated by a stimulus) on generation of a sensing signal. For example, if twenty Y sensing lines 230 are connected to the Y sensing driving chips 520, the twenty sensing lines 230 are sequentially scanned according to twenty clock signals, and zero or one is sequentially stored corresponding to the scanned Y sensing lines 230 (e.g., whether a sensing signal is input or not input).

The Y sensing driving chips 520 output a position pulse which includes a high range where a register value is stored (e.g., "1") and a low range where a sensing signal is not generated (e.g., "0"), to the signal controller 700.

Figure 5:
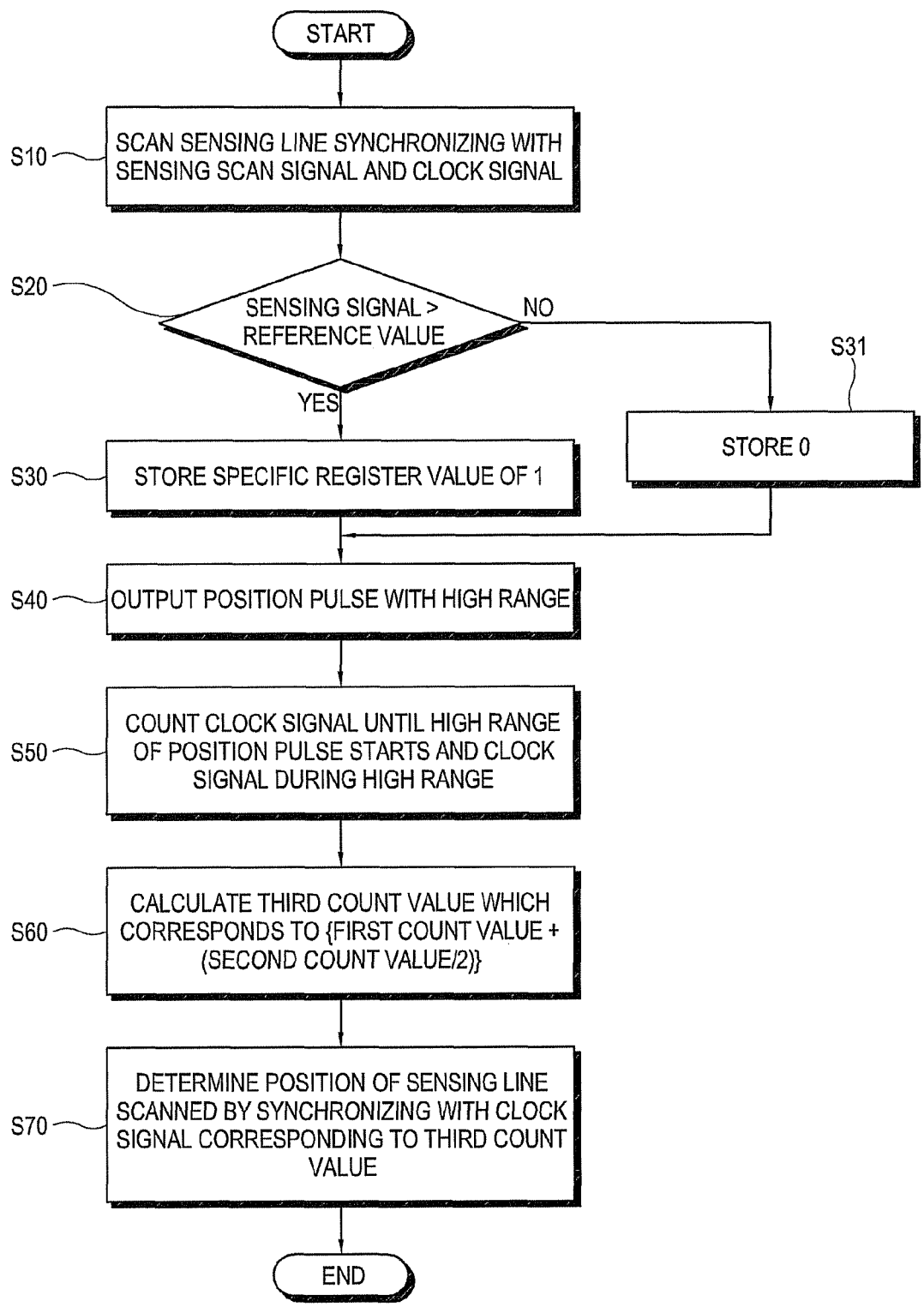
FIG. 5 is a flow chart illustrating an exemplary embodiment of a control method of a display device according to the present invention.

FIG. 5 is a flow chart illustrating an exemplary embodiment of a control method of a display device according to the present invention. Referring to FIG. 5, a process whereby the signal controller 700 determines a position (e.g., location) where a stimulus is generated according to a position pulse and a clock signal will be described in the following.

The Y sensing driving chips 520 scan the Y sensing lines 230 while synchronizing with a sensing scan signal and a clock signal from the signal controller 700 (S10).

A sensing signal output from the scanned Y sensing lines 230 is compared with a reference value by the comparator 521 of the sensing driving chips 520 (S20). If the sensing signal is greater than or over the reference value, a register value of one (e.g., "1") is stored in the memory (S30). Conversely, if the sensing signal is not transmitted, is less than or does not reach the reference value, a register value of zero (e.g., "0") is stored in the memory (S31).

the Y sensing driving chips 520 output a position pulse which includes a high range corresponding to the register value of one to the signal controller 700 (S40). The Y sensing driving chips 520 output the position pulse to the signal controller 700 nearly real-time when the Y sensing lines 230 are scanned (S10) and the register value of one is previously stored in the memory.

If the Y sensing driving chips 520 output the position pulse after predetermined time, e.g., substantially not real-time, the Y sensing driving chips 520 may output the position pulse effectively synchronizing a clock signal output from the signal controller 700. The signal controller 700 may have an information about a clock signal between when the Y sensing lines 230 are scanned and when the position pulse is output by the Y sensing driving chips 520. For example, referring to FIG. 4, while twenty Y sensing lines 230 are scanned, when fourth to eighth Y sensing lines 230 and fourteenth to sixteenth Y sensing lines 230 receive a sensing signal, a position pulse which includes two high ranges is output.

The signal controller 700 which received the position pulse checks clock signals to synchronize with the high ranges, thereby determining a position of the Y sensing lines 230 where the sensing signal is received (e.g., where the stimulus is located). As the Y sensing lines 230 are scanned by synchronizing with the clock signals, the signal controller 700 may determine a position of the Y sensing lines 230 through the clock signals corresponding to the high ranges.

In a display device, a sensing signal effected by an external stimulus may be transmitted from a plurality of Y sensing lines 230. If one stimulus is given, a plurality of sensing electrodes 235 may respond to the single stimulus because of the sensing electrodes 235 relatively dense distribution. As the sensing electrodes 235 are disposed close to the display panel, sensing electrodes disposed in a region where a stimulus is not given may be erroneously responsive to neighboring sensing electrodes 235. Thus, it may not be easy or accurate to sense a correct position of a stimulus where the stimulus is generated.

In the illustrated exemplary embodiment, the signal controller 700 determines a position of the Y sensing lines 230 corresponding to a middle point of a high range to find out an accurate position where a stimulus is generated.

The signal controller 700 counts a clock signal from when a sensing scan signal is output to when a high range of a position pulse starts, and counts a clock signal during the high range (S50). A first count value refers to the number of a clock signal which the signal controller 700 counts from when a sensing scan signal is output to when a high range of a position pulse starts. A second count value refers to the number of a clock signal during the high range.

Then, the signal controller 700 calculates a third count value according to the following equation 1(S60).

Third count value=first count value+(second count value/2) [Equation 1]

In a first high range with reference to FIG. 4, as a first count value is 4 and a second count value is 5, a third count value becomes 6.5, i.e., 4+2.5=6.5, by the Equation 1. In one exemplary embodiment, a decimal part may be dropped, such that the third count value is 6. Alternatively, it is noted that treating of the decimal part may be variously changed, such as by rounding the calculated value instead of not counting the decimal part. The third count value becomes 6 from 6.5 by dropping the decimal part.

In a second high range with reference to FIG. 4, a first count value is 14, a second count value is 3, and thus a third count value becomes 15, such as by dropping the decimal part and considering the integer part only.

The signal controller 700 determines a position of the scanned Y sensing lines 230 by synchronizing with a clock signal corresponding to a third count value (S70). That is, the signal controller 700 may determine that a sensing signal is transmitted through a single Y sensing line 230 scanned by synchronizing with a sixth clock signal, and another single Y sensing line 230 scanned by synchronizing with a fifteenth clock signal (See FIG. 4).

In the illustrated embodiments, if a plurality of sensing electrodes 235 respond to one stimulus, the signal controller 700 determines a position of a single Y sensing line 230 corresponding to a middle point of a high range, and determines that the stimulus is generated in one Y sensing electrode 235 connected to the Y sensing line 230 of which the position is determined. Similarly, if a sensing signal is transmitted from a plurality of X sensing lines 240, the signal controller 700 determines a position of a single X sensing line 240 where a stimulus is generated according to the foregoing method. Advantageously, a correct position indicating where the stimulus is generated may be relatively easy and reliably determined, even when a sensing signal is transmitted from a plurality of sensing lines.

Figure 6:
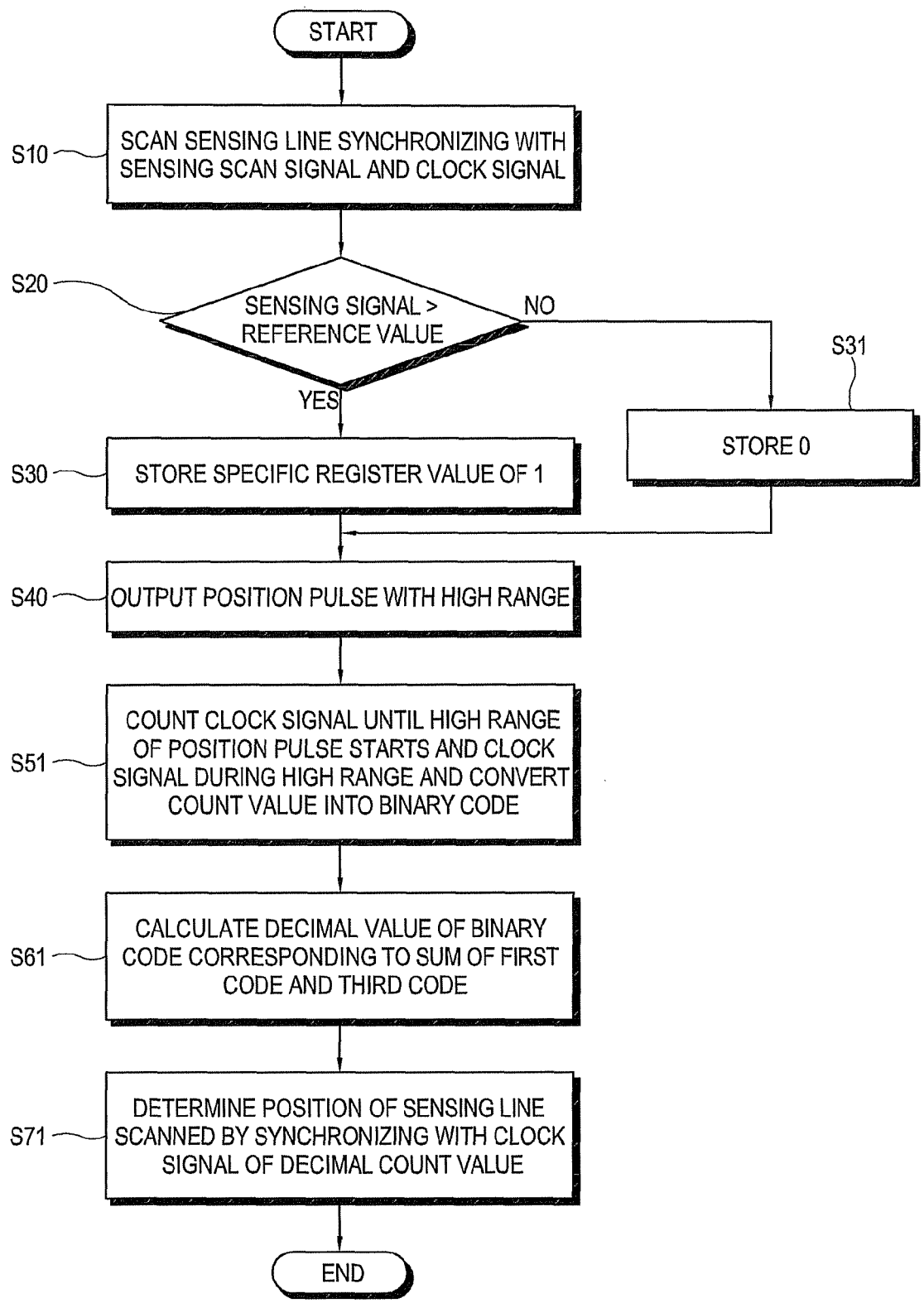
FIG. 6 is a flow chart illustrating another exemplary embodiment of a control method of a display device according to the present invention.

FIG. 6 is a flow chart illustrating another exemplary embodiment of a control method of a display device according to the present invention. The control method according to the present exemplary embodiment essentially follows the same process as in FIG. 5 from the operation S10 where a Y sensing line 230 is scanned to the operation S40 where a position pulse is output.

Referring to FIG. 6, a signal controller 700 which received a position pulse (e.g., at S40), counts a clock signal from when a sensing scan signal is output to when a high range of the position pulse starts, and counts a clock signal during the high range. Different from the method in FIG. 5, the signal controller 700 in the exemplary method of FIG. 6 converts count values into binary codes (S51).

In the illustrated exemplary embodiment in FIG. 6, a first code refers to a binary code of a count value of the clock signal from when the sensing scan signal is output to when the high range of the position pulse starts. A second code refers to a binary code of a count value of the clock signal during the high range. A third code refers to a binary code whereby a lowest code is deleted from the second code. The signal controller 700 calculates a decimal value of a binary code corresponding to a sum of the first code and the third code (S61).

That is, in a first high range with reference to FIG. 4, a first count value is 4, and thus a first code becomes 100. As a second count value is 5, a second code becomes 101. When one code, such as the lowest code, is deleted from the second code, the third code becomes 10. A binary code of a sum of the first code and the third code is 110, and a decimal value thereof becomes 6.

In a second high range with reference to FIG. 4, the first code is 1110, the second code is 11 and the third code is 1. A binary code of a sum of the first code and the third code is 1111, and a decimal value thereof becomes 15.

The signal controller 700 determines a position of the scanned Y sensing line 230 by a synchronizing with the clock signal of the decimal count value (S71).

Figure 7:
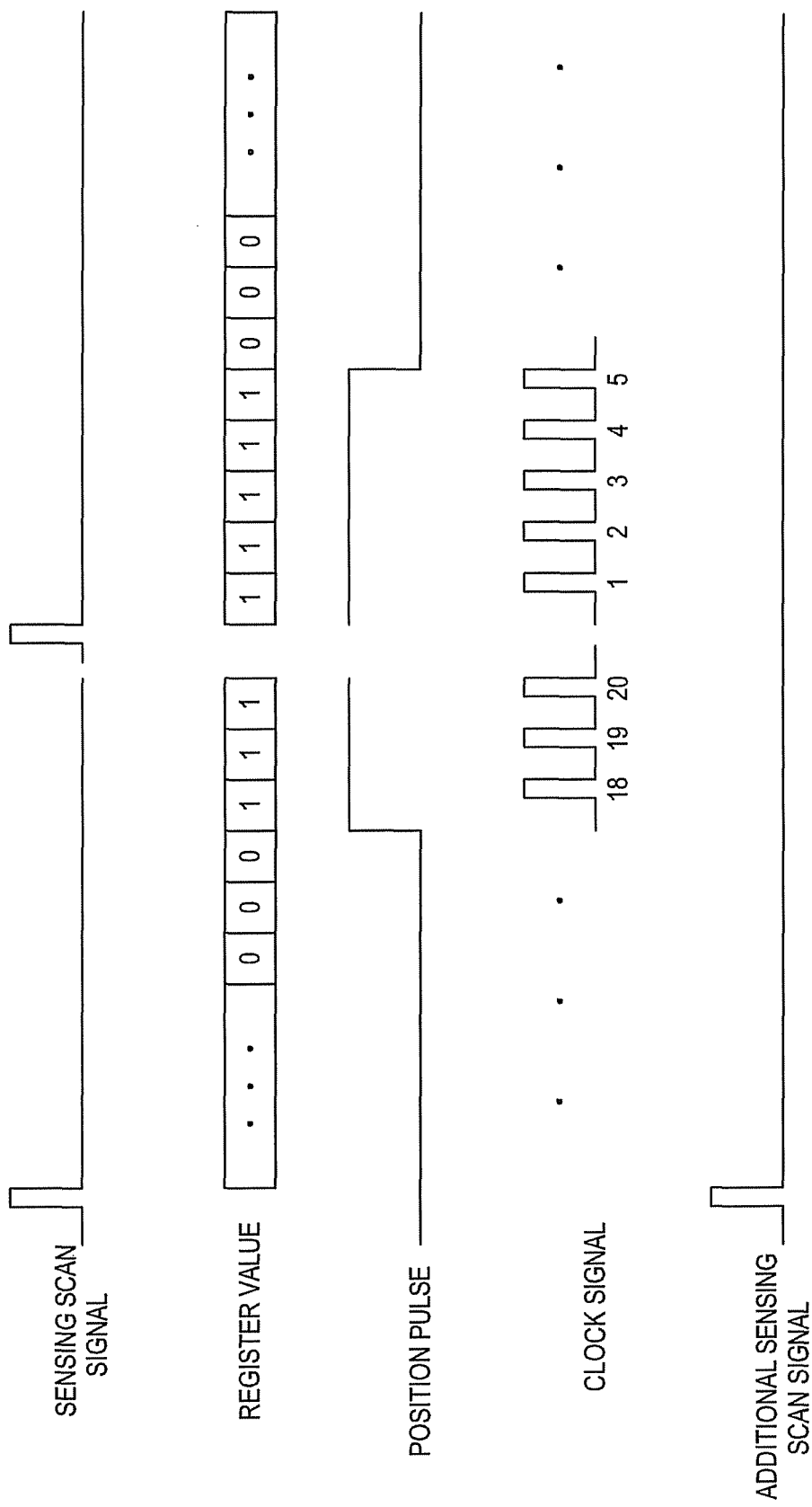
FIG. 7 is a waveform of a signal illustrating another exemplary embodiment of a control method of a display device according to the e present invention.
Figure 8:
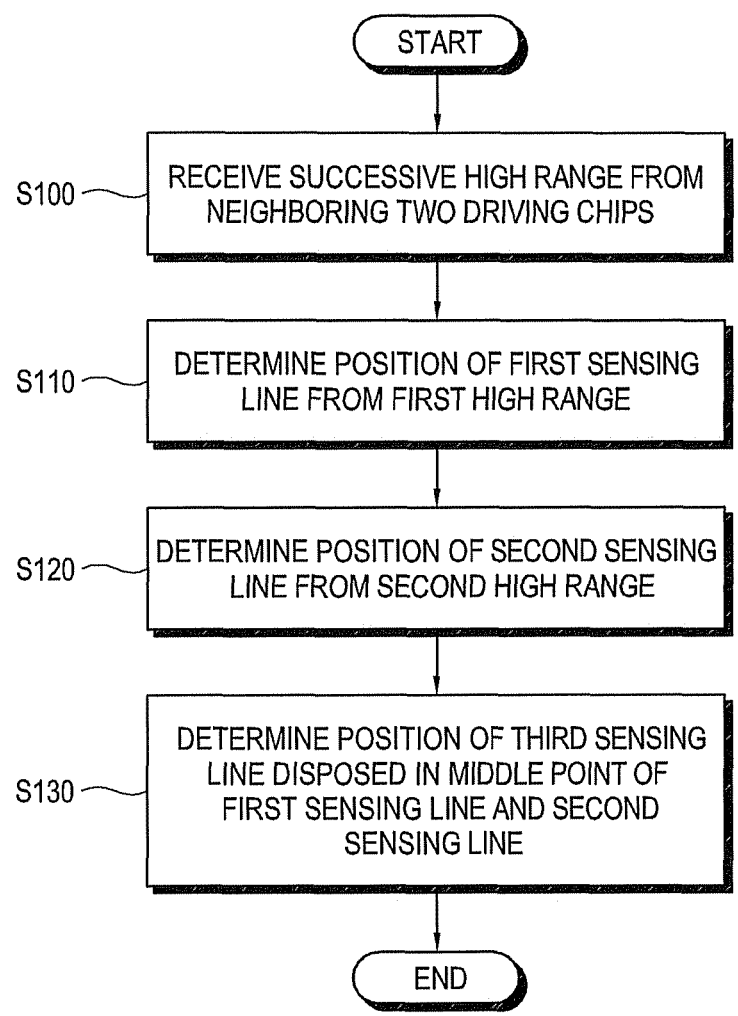
FIG. 8 is a flow chart illustrating the control method of the display device of FIG. 7 according to the present invention.

FIGS. 7 and 8 illustrate another exemplary embodiment of a control method of a display device according to the present invention. Referring to FIG. 7, if a high range of a position pulse output from Y sensing driving chips 520 which are disposed adjacent to each other is successive, a signal controller 700 determines a position of a sensing line corresponding to a middle point of the high range from each of the sensing driving chips 520.

One of two neighboring Y sensing driving chips 520 is hereinafter referred to as a first driving chip. The other of two neighboring Y sensing driving chips 520 is referred to as a second driving chip. A first sensing line is connected to the first driving chip, and a second sensing line is connected to the second driving chip. Sensing signals may be output from both of the first sensing line and the second sensing line which are disposed adjacent to each other, with respect to a stimulus at substantially the same time. A first high range I output from the first sensing line and a second high range II output from the second sensing line are successive.

Since separate sensing scan signals are output to the first driving chip and the second driving chip, respectively, the signal controller 700 determines a position of the first sensing line where a stimulus is given from the first high range I, and a position of the second sensing line where a stimulus is given from the second high range II, such as by the control methods according to FIG. 5 and/or FIG. 6. That is, the signal controller 700 determines the position of the first sensing line scanned corresponding to a nineteenth clock signal from the first high range, and the position of the second sensing line scanned corresponding to a third clock signal from the second high range, referring to FIG. 7.

In the illustrated exemplary embodiment, the signal controller 700 determines a position of a third sensing line disposed in a middle point of the first sensing line and the second sensing line to reduce or effectively prevent erroneously recognizing two positional informations with respect to one stimulus. The signal controller 700 outputs an additional sensing scan signal (e.g., a control sensing signal), to control timing of all input position pulses while outputting the individual separate sensing scan signals to the first and second driving chips. Namely, the additional sensing scan signal is provided as a reference to count a clock signal output to the driving chips apart from the individual separate sensing scan signals.

In an exemplary embodiment, the signal controller 700 may count a clock signal corresponding to a first middle point of the first high range I, a clock signal corresponding to a second middle point of the second high range II, and a clock signal corresponding to a third middle point of the first and second middle points, thereby determining the position of the third sensing line scanned by synchronizing with a finally counted clock signal. Advantageously, a correct position indicating where the stimulus is generated may be relatively easy and reliably determined.

Referring to FIG. 8, the control method according to the illustrated exemplary embodiment of FIG. 7 will be described as follows. If a position pulse which includes successive high ranges from neighboring driving chips (S100) is received, the signal controller 700 determines the position of the first sensing line from the first high range I and the position of the second sensing line from the second high range II (S110 and S120).

The signal controller 700 counts a clock signal according to the additional sensing scan signal, thereby determining the position of the third sensing line disposed in the middle point of the first and second sensing lines (S130).

Figure 9:
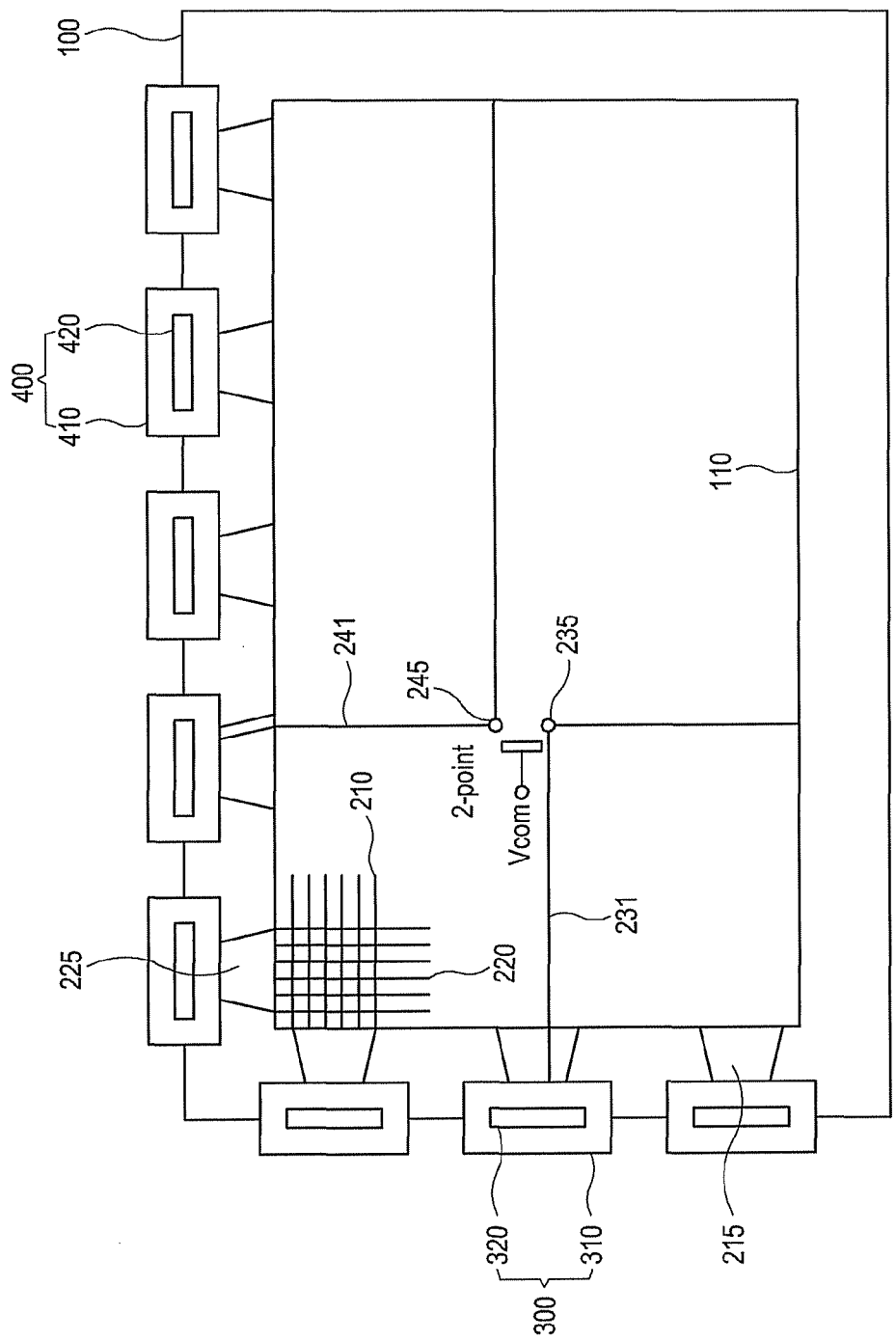
FIG. 9 is a schematic view of another exemplary embodiment of a display device according to the present invention.

FIG. 9 is a schematic view of another exemplary embodiment of a display device according to the present invention.

As shown in FIG. 9, the display device does not include separate Y and X sensing driving chips. In other words, sensing drivers, which are provided as sensing driving chips 520 and 620 in previous embodiments, are mounted on a gate driving chip 320 and a data driving chip 420. Thus, in the illustrated exemplary embodiment, the gate driving chip 320 and the data driving chip 420 apply a sensing scan signal to sensing lines 231 and 241, receive an electric signal from the sensing lines 231 and 241 to store it as a specific register value, and output a position pulse to a signal controller 700.

In the illustrated embodiment, the sensing driver may not formed with a separate sensing driving chip, but instead mounted on the gate driving chip 320 and/or the data driving chip 420. Advantageously, a manufacturing cost of a driving chip is reduced and a configuration of a display panel 100 is simplified.

As in the illustrated exemplary embodiments, the present invention provides a display device which efficiently responds to an external stimulus, and is improved in its sensitivity, and a control method of the same.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
   a display panel comprising a plurality of pixels;
   a sensing electrode generating a sensing signal in response to an external stimulus;
   a sensing line connected to the sensing electrode;
   a sensing driver connected to the sensing line, receiving the sensing signal from the sensing line and storing the sensing signal as a specific register value, and outputting a position pulse according to the specific register value; and
   a signal controller determining a position of the external stimulus on the display panel based on the position pulse and a number of clock pulses of a predetermined clock signal having a single frequency,
   wherein the signal controller outputs a sensing scan signal to the sensing driver, and the sensing driver scans the sensing line while being synchronized with the sensing scan signal and the predetermined clock signal,
   wherein the position pulse comprises a high range corresponding to a part of the display panel where the external stimulus is applied to the display panel, and
   wherein the signal controller determines a position of the sensing line scanned by synchronizing with the predetermined clock signal corresponding to a third count value calculated based on a count value of first clock pulses of the predetermined clock signal from a point when the sensing scan signal is output to a point when the high range of the position pulse starts, and a count value of second clock pulses of the predetermined clock signal during the high range.

2. The display device according to claim 1, wherein the sensing signal comprises a predetermined electric signal, and the sensing driver stores the predetermined electric signal as the specific register value if the predetermined electric signal is greater than a preset reference value.

3. The display device according to claim 1, wherein the third count value is calculated by the following Equation 1, where a first count value refers to the count value of the first clock pulses, and a second count value refers to the count value of the second clock pulses:

$$\text{Third count value} = \text{first count value} + (\text{second count value}/2). \quad \text{[Equation 1]}$$

4. The display device according to claim 3, wherein the sensing driver comprises a driving chip disposed along a side of the display panel.

5. The display device according to claim 4, wherein the driving chip comprises a first driving chip and a second driving chip disposed adjacent to the first driving chip, the first driving chip and the second driving chip being connected to a plurality of sensing lines, respectively, and
   the signal controller determines that the external stimulus is applied in a position of a third sensing line disposed at a middle point of a position of a first sensing line included in a first high range, and a position of a second sensing line included in a second high range, if the first high range of a first position pulse output from the first driving chip and the second high range of a second position pulse output from the second driving chip are successive.

6. The display device according to claim 4, wherein the sensing line comprises a Y sensing line extending in a first direction and transmitting a Y position information of the position where the external stimulus is applied on the display panel, and an X sensing line extending in a second direction substantially perpendicular to the first direction and transmitting an X position information of the position where the external stimulus is applied, and
   the sensing driver comprises a Y sensing driving chip connected to the Y sensing line, and an X sensing driving chip connected to the X sensing line.

7. The display device according to claim 1, wherein the signal controller calculates a decimal count value of a binary code corresponding to a sum of a first code and a third code, and determines the position of the sensing line scanned by synchronizing with the predetermined clock signal of the decimal count value, if the first code refers to a binary code of a first count value of the predetermined clock signal from when the sensing scan signal is output to when the high range of the position pulse starts, a second code refers to a binary code of a second count value of the predetermined clock signal during the high range, and the third code refers to a binary code where one lowest code is deleted from the second code.

8. The display device according to claim 7, wherein the sensing driver comprises a driving chip disposed along a side of the display panel.

9. The display device according to claim 8, wherein the driving chip comprises a first driving chip and a second driving chip disposed adjacent to the first driving chip, the first driving chip and the second driving chip being connected to a plurality of sensing lines, respectively, and the signal controller determines that the external stimulus is applied in a position of a third sensing line disposed at a middle point of a position of a first sensing line included in a first high range and a position of a second sensing line included in a second high range if the first high range of a first position pulse output from the first driving chip and the second high range of a second position pulse output from the second driving chip are successive.

10. The display device according to claim 8, wherein the sensing line comprises a Y sensing line extending in a first direction and transmitting a Y position information of the position where the external stimulus is applied on the display panel, and an X sensing line extending in a second direction substantially perpendicular to the first direction and transmitting an X position information of the position where the external stimulus is applied, and the sensing driver comprises a Y sensing driving chip connected to the Y sensing line, and an X sensing driving chip connected to the X sensing line.

11. The display device according to claim 1, further comprising:

a gate line and a data line crossing the gate line, the gate line and the data line being formed on the display panel;

a gate driving chip applying a gate signal to the gate line; and a data driving chip applying a data signal to the data line, wherein the sensing driver is mounted in the gate driving chip or the data driving chip.

12. A control method of a display device which comprises a plurality of pixels and a plurality of sensing lines, the method comprising:

receiving a sensing signal from the sensing lines by a sensing driver connected to the sensing lines;

scanning the sensing lines synchronizing with a predetermined sensing scan signal and a predetermined clock signal;

storing the sensing signal as a specific register value by the sensing driver;

outputting a position pulse comprising a high range corresponding to a part where a stimulus is applied to the display device according to the specific register value by the sensing driver;

determining a position, by a signal controller, where the stimulus is applied on a basis of the position pulse and a number of clock pulses of the predetermined clock signal having a single frequency, wherein the determining the position comprises:

defining a first count value where first pulses of the predetermined clock signal are counted from a point when the predetermined sensing scan signal is output to a point when the high range of the position pulse starts;

defining a second count value where second pulses of the predetermined clock signal are counted during the high range; and calculating a third count value using the first count value and the second count value.

13. The control method according to claim 12, wherein the sensing signal comprises a predetermined electric signal, and the storing a register value comprises storing the predetermined electric signal as the specific register value if the predetermined electric signal is greater than a preset reference value.

14. The control method according to claim 12, wherein the determining the position further comprises:

calculating the third count value by the following Equation 1, and determining a position of the sensing lines scanned by synchronizing with the predetermined clock signal corresponding to the third count value:

Third count value=first count value+(second count value/2). [Equation 1]

15. The control method according to claim 14, wherein the display device comprises a first driving chip and a second driving chip disposed adjacent to the first driving chip, the first driving chip and the second driving chip being connected to the plurality of sensing lines, respectively, and the determining a position determines that the stimulus is applied in a position of a third sensing line disposed at a middle point of a position of a first sensing line included in a first high range, and a position of a second sensing line included in a second high range, if the first high range of a first position pulse output from the first driving chip and the second high range of a second position pulse output from the second driving chip are successive.

16. The control method according to claim 12, wherein the determining a position comprises:

determining the first count value where the first pulses of the predetermined clock signal are counted from when the predetermined sensing scan signal is output to when the high range of the position pulse starts and the first count value is converted into a binary code;

determining the second count value where the second pulses of the predetermined clock signal are counted during the high range and the second count value is converted into a binary code; and calculating a decimal value of a binary code corresponding to a sum of a first code and a third code and determining a position of the sensing lines scanned by synchronizing with the predetermined clock signal of the decimal count value if the first code refers to the binary code of the first count value, a second code refers to the binary code of the second count value, and the third code refers to a binary code that one lowest code is deleted from the second code.

17. The control method according to claim 16, wherein the display device comprises a first driving chip and a second driving chip disposed adjacent to the first driving chip, the first driving chip and the second driving chip being connected to the plurality of sensing lines, respectively, and the determining a position determines that the stimulus is applied in a position of a third sensing line disposed at a middle point of a position of a first sensing line included in a first high range, and a position of a second sensing line included in a second high range, if the first high range of a first position pulse output from the first driving chip and the second high range of a second position pulse output from the second driving chip are successive.

\* \* \* \* \*